A. J. GAULIN & A. VAN WYKE.
AIR BRAKE.
APPLICATION FILED MAR. 10, 1914.
1,120,302.
Patented Dec. 8, 1914.
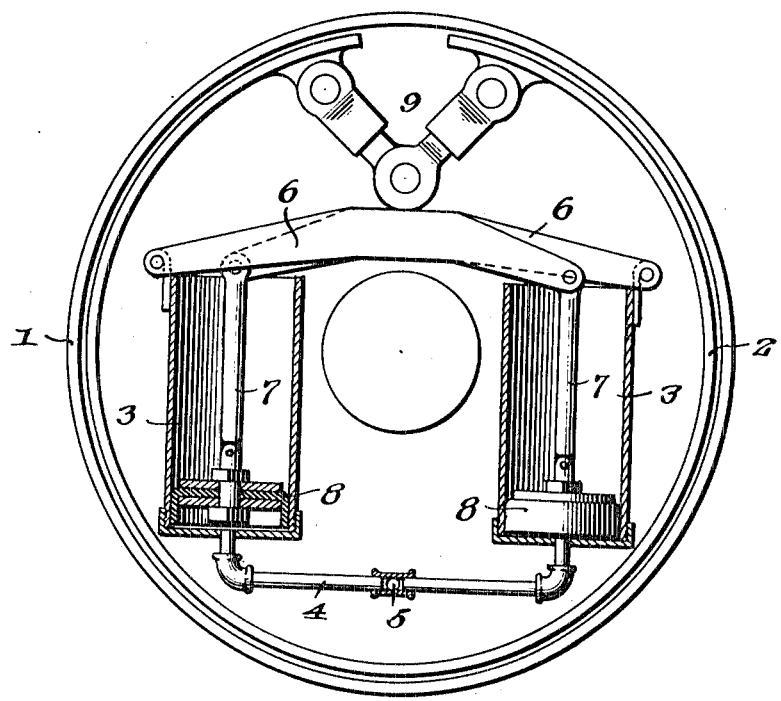
Witnesses
Hugh H. Ott
U. B. Hillyard.
Inventors
Arthur J. Gaulin
Arthur Van Wyke
By Victor J. Evans
Attorney

UNITED STATES PATENT OFFICE.

ARTHUR J. GAULIN AND ARTHUR VAN WYKE, OF CHARLESTON, MASSACHUSETTS.

AIR-BRAKE.

1,120,302.   Specification of Letters Patent.   Patented Dec. 8, 1914.

Application filed March 10, 1914. Serial No. 823,769.

*To all whom it may concern:*

Be it known that we, ARTHUR J. GAULIN and ARTHUR VAN WYKE, citizens of the United States, residing at Charleston, in the county of Suffolk and State of Massachusetts, have invented new and useful Improvements in Air-Brakes, of which the following is a specification.

The primary object of the invention is the provision of a novel brake mechanism for vehicles, adapted to use a fluid medium and which is positive and effective in operation.

The invention consists of a brake band, two brake cylinders, pistons arranged to operate therein and novel connecting means between opposite ends of the brake band and the pistons, all as set forth hereinafter, pointed out in the appended claim and illustrated in the accompanying drawing which is a view in elevation of a brake drum, brake band and connecting and operating means associated therewith embodying the invention.

The brake drum 1 may be of ordinary construction and arrangement, such as commonly provided for use in connection with a vehicle wheel. The brake band 2 is arranged within the brake drum and engages the latter when expanded. Brake cylinders 3 are arranged within the drum upon opposite sides of the axle and are connected by means of a pipe 4 which in turn is connected with a pipe 5 which leads from a source of supply of motive medium. A piston 8 is arranged within each of the brake cylinders 3 and has a rod 7. Levers 6 extend across the brake cylinders and each of such levers is connected at one end to a piston rod 7 and at its opposite end to the brake cylinder remote from that in which the piston rod operates to which the lever 6 is connected. An expansion joint 9 connects the levers 6 to the ends of the brake band 2 so that when the pistons 8 are forced outward in their respective cylinders the brake band is expanded and caused to frictionally engage the inner side of the brake drum. When the fluid medium is cut off from the brake cylinders and the latter are permitted to bleed the pistons 8 move inward and the brake band 2 contracts and clears the brake drum thereby releasing the brake. It is to be understood that the fluid medium may consist of steam or compressed air and may be supplied in any manner.

From the foregoing description, taken in connection with the accompanying drawings, the advantages of the construction and of the method of operation will be readily apparent to those skilled in the art to which the invention appertains, and while we have described the principle of operation of the invention, together with the device which we now consider to be the best embodiment thereof, we desire to have it understood that the device shown is merely illustrative, and that such changes may be made when desired as are within the scope of the invention as claimed.

Having thus described the invention, what is claimed as new is:—

In a vehicle brake, the combination of a brake drum, a brake band arranged for conjoint operation with the brake drum, oppositely disposed brake cylinders, a lever for each of the cylinders, such lever being pivoted at one end to one of the cylinders and connected at its opposite end to the piston of the other brake cylinder, connecting means between said levers and the ends of the brake bands and means for supplying pressure to the brake cylinders.

In testimony whereof we affix our signatures in presence of two witnesses.

ARTHUR J. GAULIN.
  ARTHUR VAN WYKE.

Witnesses:
 M. SINGER,
 M. M. CHEW.